United States Patent Office 3,632,586
Patented Jan. 4, 1972

3,632,586
SULFUR DIOXIDE ADDITION PRODUCT
Karl Brack, Wilmington, Del., assignor to Hercules Incorporated, Wilmington, Del.
No Drawing. Filed Jan. 29, 1968, Ser. No. 703,847
Int. Cl. C07d 51/70
U.S. Cl. 260—268 S    3 Claims

ABSTRACT OF THE DISCLOSURE

Disclosed is a sulfur dioxide addition product having the formula:

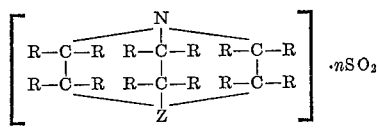

wherein Z is selected from the group consisting of the N and R—C radicals, each R is independently selected from the group consisting of the hydrogen and $C_1$–$C_8$ alkyl radicals $n$ is 1 when Z is the R—C radical and $n$ is 1–2 when Z is the N radical. This addition product is made by contacting a compound having the formula:

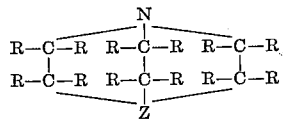

with sulfur dioxide under substantially anhydrous conditions and preferably in an inert liquid in which the compound is substantially soluble and the addition product is substantially insoluble.

---

This invention comprises a sulfur dioxide addition product and a process for making it.

The sulfur dioxide addition product of this invention is a compound represented by the formula:

(I) 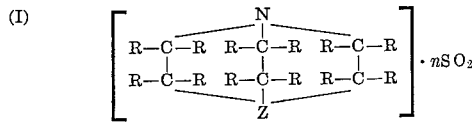

wherein Z is selected from the group consisting of the N and R—C radicals, each R is independently selected from the group consisting of the hydrogen and $C_1$–$C_8$ alkyl radicals, $n$ is 1 when Z is the R—C radical, and $n$ is 1–2 when Z is the N radical. Specific embodiments of the sulfur dioxide addition product of this invention include the sulfur dioxide adducts of quinuclidine,
2-methylquinuclidine,
2-ethylquinuclidine,
3-methylquinuclidine,
3-ethylquinuclidine,
4-methylquinuclidine,
2,6-dimethylquinuclidine,
3,5-dimethylquinuclidine,
2,2,6-trimethylquinuclidine,
3-ethyl-3-methylquinuclidine, and the like, and the mono- and di(sulfur dioxide) adducts of 1,4-diazabicyclo[2.2.2]octane,
2-methyl-1,4-diazabicyclo[2.2.2]octane,
2-ethyl-1,4-diazabicyclo[2.2.2]octane,
2,3-dimethyl-1,4-diazabicyclo[2.2.2]octane,
2,5-dimethyl-1,4-diazabicyclo[2.2.2]octane,
2,6-dimethyl-1,4-diazabicyclo[2.2.2]octane,
2,5,7-trimethyl-1,4-diazabicyclo[2.2.2]octane,
2,2,5,5-tetramethyl-1,4-diazabicyclo[2.2.2]octane, and the like.

In general the specific embodiments of the sulfur dioxide addition product of this invention are solid at 20–25° C. and have melting points substantially above 20–25° C. Under anhydrous conditions and at 20–25° C. they are stable. However, water causes them to decompose and at temperatures usually substantially above 20–25° C. slow thermal decomposition occurs. They are substantially insoluble at 20–25° C. in most organic solvents including acetone, methyl ethyl ketone, n-heptane, cyclohexane, toluene, and the like.

The sulfur dioxide addition product of this invention has utility as a cross-linking agent for unsaturated polymers cross-linkable by sulfur dioxide. By admixing the sulfur dioxide addition product with a substantially uncross-linked, ethylenically unsaturated polymer, and establishing the temperature of the resulting mixture at a temperature at which takes place substantial thermal decomposition of the addition product, but not of the polymer, substantial cross-linking of the polymer is effected.

The sulfur dioxide addition product of this invention, except when with reference to Formula I $n$ is 1 and Z is the N radical, also has utility in curable or cross-linkable, ethylenically unsaturated, polymer compositions which comprise a latent base and which are useful as sealants, adhesives, coatings, and the like. A latent base is material which in the absence of water and heat is inert relative to the other components of the composition, but which, upon contact with water and/or upon the application of heat, provides alkaline substance that reacts with a precursor component (for example, one or more compounds, having one or more hydroximoyl halide, carbonylnitrolic acid and hydrazide halide groups) of the composition to form a cross-linking agent (for example, one or more compounds having one or more nitrile N-oxide or nitrile imine groups), for the ethylenically unsaturated polymer component of the composition. The addition product when there is an $SO_2$ component for each N radical forms part or all of the latent base in such compositions.

The sulfur dioxide addition product of this invention is useful also as a catalyst for polyurethanes and the like.

The sulfur dioxide addition product of this invention is made by admixing under anhydrous conditions a compound having the formula (II) 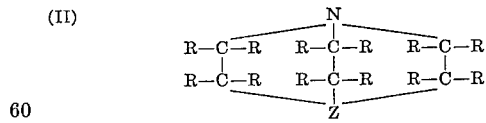

wherein Z and R have the same meanings as in Formula I, and sulfur dioxide. Compounds of Formula II are known, and are either commercially available or can be made according to processes disclosed in the piror art. Sulfur dioxide reacts with compounds of Formula II, when Z is the R—C radical, on a 1:1 mole basis. It reacts with compounds of Formula II when Z is the N radical and $n$ is 2 on a 2:1 mole basis. In these two instances it is preferred that the quantity of sulfur dioxide mixed with the compound or compounds be in stoichiometric excess. Sulfur dioxide reacts with compounds of Formula II when Z is the N radical and $n$ is 1 on a 1:1 mole basis, and in this instance it is preferred that the quantity of sulfur dioxide admixed with the compound or compounds be substantially less than one mole per mole of the compound or compounds. The reaction takes place at 20–25° C., although higher and lower temperatures can be employed. It also occurs at atmospheric pressure, although higher and lower pressures can be used. Preferably, the reaction is effected in a relatively inert, anhydrous liquid reaction medium in which the reactants are soluble, but the addition product is substantially insoluble. Examples of such a liquid reaction medium include benzene, toluene, hexane, methylene chloride, and the like as well as mixtures thereof.

This invention is further illustrated by the following specific examples of various aspects of this invention, including preferred specific embodiments. This invention is not limited to these embodiments. In these examples, all parts and percentages are by weight, unless otherwise expressly indicated.

EXAMPLE 1

This example illustrates the synthesis of the di(sulfur dioxide) adduct of 1,4-diazabicyclo[2.2.2]octane.

20 parts of 1,4-diazabicyclo[2.2.2]octane, also known as triethylenediamine, are dissolved in 356 parts of tetrahydrofuran. 100 parts of Linde 4A molecular sieve pellets are added to the resulting solution to remove any water that might be present. The mixture of pellets and solution is kept in a closed vessel for 20 hours at 20–25° C. The solution is decanted under nitrogen and then saturated with anhydrous sulfur dioxide gas. A precipitate forms. The precipitate is separated from the reaction mixture by filtration under nitrogen. The filter cake is then subjected for 2 hours at 20–25° C. to a vacuum of 0.3 millimeter of mercury to remove residual solvent.

The resulting product is a white crystalline powder. It consists essentially of the di(sulfur dioxide) adduct of 1,4-diazabicyclo[2.2.2]octane. It has a typical melting point of 173–174° C. A typical analysis of the product is—

Calculated (percent): C, 30.0; H, 5.0; N, 11.7; S, 26.7; O, 26.7. Found (percent): C, 31.1; H, 5.7; N, 11.7; S, 26.7; O, 26.2.

A typical yield of the product is 30.6 parts.

The other di(sulfur dioxide) adducts of this invention and the sulfur dioxide adducts of compounds of Formula II when Z is the R–C radical are made in similar fashion.

EXAMPLE 2

This example illustrates the synthesis of the mono(sulfur dioxide) adduct of 1,4-diazabicyclo[2.2.2]octane.

10 parts of 1,4-diazabicyclo[2.2.2]octane are dissolved in 300 parts of anhydrous hexane. Anhydrous sulfur dioxide (3 parts) is added to this solution. A voluminous white precipitate typically forms immediately. The precipitate is removed from the reaction mixture by filtration in an inert atmosphere, and then is subjected to 15 millimeters of mercury vacuum at 25° C. until substantially all residual solvent is removed. The product thus obtained is a white powder. It consists essentially of the mono(sulfur dioxide)adduct of 1,4-diazabicyclo[2.2.2] octane. A typical melting point of the product is 139.6–140.4° C. A typical analysis of the product is—

Calculated (percent): C, 41.0; H, 6.8; N, 15.9; S, 18.2; Found (percent): C, 40.4; H, 7.2; N, 15.4; S, 18.4.

A typical yield of the product under these conditions is 7.5 parts.

EXAMPLE 3

This example illustrates the utility of the sulfur dioxide addition product of this invention in a cross-linkable ethylenically unsaturated polymer sealant composition in which cross-linking is initiated by exposure of the composition to atmospheric moisture.

The formulation of a specific embodiment of this sealant composition is—

| Components: | Parts |
|---|---|
| Anhydrous cross-linkable ethylenically unsaturated polymer | 4.4 |
| Anhydrous terephthaloyl bis(hydroximoyl chloride) | 0.7 |
| Di(sulfur dioxide) adduct of 1,4-diazabicyclo[2.2.2]octane | 1.0 |

The anhydrous cross-linkable ethylenically unsaturated polymer is a copolyester made by reacting 1000 parts of bis(hydroxyethoxyethyl)dimerate and 175 parts of maleic anhydride. The cross-linkable polymer thus obtained typically has a molecular weight of 2327, an acid number of 51.0, an ester number of 222.3, a hydroxyl number of 19.7, a fumarate ester content (calculated as fumaric acid) of 7.53% and a maleic ester content (calculated as maleic anhydride) of 4.91%.

The sealing composition of this formulation is made as follows. The anhydrous cross-linkable polymer and the anhydrous terephthaloyl-bis(hydroximoyl chloride) are dissolved in 17.8 parts of anhydrous tetrahydrofuran. The tetrahydrofuran is then removed in vacuo at 20–25° C. The resulting heavy oil and the di(sulfur dioxide) adduct are then milled together in a mortar under an inert atmosphere until a homogenous cream is obtained. This cream is the desired sealant composition.

The cream itself can be stored at 20–25° C. in the absence of moisture for several months without curing. However, when the cream is exposed to the open atmosphere as a film of ⅛ inch thickness, it cures integrally in 2–5 days.

Other embodiments of this composition, based on other di(sulfur dioxide) adducts of this invention and on the sulfur dioxide adducts of the compounds of Formula II where Z is the R–C radical are made in similar fashion with the latter adducts preferably being used in twice the mole quantity of the di(sulfur dioxide) adducts.

EXAMPLE 4

This example illustrates another cross-linkable polymer sealant composition of the type employing a latent base.

The formulation of a specific embodiment of this composition is—

| Components: | Parts |
|---|---|
| Anhydrous cross-linkable polymer | 33 |
| Isophthaloylbis(hydrazide chloride) | 8.4 |
| Di(sulfur dioxide) adduct of 1,4-diazabicyclo[2.2.2]octane | 6 |

The cross-linkable polymer in this formulation is the same as that described in Example 3.

The sealant composition of this formulation is made by dissolving the cross-linkable polymer and the anhydrous isophthaloyl-bis(hydrazide chloride) in 50 parts of anhydrous tetrahydrofuran, removing the tetrahydrofuran under subatmospheric pressure at 20–20° C., and then admixing under a nitrogen atmosphere the resulting viscous oil with the di(sulfur dioxide) adduct until a homogenous yellowish cream is obtained. This is the desired sealant composition.

This composition can be stored in the absence of moisture for several months without curing. On the other hand, when cast as a film of ⅛" thickness and then exposed to the open atmosphere, it cures within 2–5 days to a rubber that typically is insoluble in tetrahydrofuran.

Other embodiments of this composition, based on other di(sulfur dioxide) adducts of this invention and on the sulfur dioxide adducts of the compounds of Formula II where Z is the R–C radical, are made in similar fashion with the latter adducts preferably being used in twice the mole quantity of the di(sulfur dioxide)adducts.

EXAMPLE 5

This example illustrates the utility of the sulfur dioxide addition product of this invention as a cross-linking catalyst for unsaturated polyester compositions.

The formulation of a specific embodiment of the unsaturated polyester composition of this example is—

| Components: | Parts |
|---|---|
| Unsaturated polyester | 100 |
| Di(sulfur dioxide) adduct of 1,4-diazabicyclo[2.2.2]octane | 1.2 |

The unsaturated polyester is a product made substantially as described in Example I of the U.S. Pat. No. 2,634,251, to Kass.

This composition in crosslinked condition is made by admixing the components in a closed vessel under nitrogen, and then establishing and maintaining for 2 hours the temperature of the mixture at 170° C. The resulting product is cross-linked, being insoluble in tetrahydrofuran. A sample of the polyester alone, when established and maintained for 2 hours under nitrogen at 170° C. remains soluble in tetrahydrofuran.

Again, other embodiments of this composition based on other di(sulfur dioxide) adducts of this invention and on the sulfur dioxide adducts of the compounds of Formula II wherein Z is the R—C radical, are made in similar fashion with the quantities of the latter adducts preferably being greater so that in each case it is about twice the mole quantity of the di(sulfur dioxide) adduct.

EXAMPLE 6

This example illustrates the utility of the mono(sulfur dioxide) addition product of this invention as a cross-linking catalyst for unsaturated polyester compositions.

The formulation of a specific embodiment of the unsaturated polyester composition of this example is —

| Components: | Parts |
|---|---|
| Unsaturated polyester | 100 |
| Mono(sulfur dioxide) adduct of 1,4-diazabicyclo[2.2.2]octane | 5.0 |

The unsaturated polyester is a product made substantially as described in Example I of the U.S. Pat. No. 2,634,251, to Kass.

This composition in cross-linked or cured condition is made by admixing the components in a closed vessel under nitrogen, and then establishing and maintaining for 2 hours the temperature of the mixture at 180° C. The resulting product is cross-linked, being insoluble in common solvents for the uncross-linked polyester, such as tetrahydrofuran, methylene chloride, methyl isobutyl ketone and the like.

Other embodiments of this composition, based on other mono(sulfur dioxide) adducts of this invention are made in similar fashion.

The mono(sulfur dioxide) adducts of this invention are useful also in the synthesis of the corresponding di(sulfur dioxide) adducts of this invention. The mono(sulfur dioxide) adducts are admixed under substantially anhydrous conditions at 20–25° C. and at atmospheric pressure with sulfur dioxide on at least a 1:1 mole basis and preferably with the sulfur dioxide in stoichiometric excess. Of course, higher and lower temperatures and higher and lower ambient pressures can be employed as long as the di(sulfur dioxide) adduct being formed remains substantially stable.

Thus there is provided a new and useful compound.

Other features and advantages of the new compound of this invention will be readily apparent to those exercising ordinary skill in the art to which this invention pertains after reading the foregoing disclosures. While specific embodiments of the compound of this invention, of processes of making it, and of compositions containing it have been described in considerable detail, variations and modifications of these specific embodiments can be effected without departing from the spirit and scope of the invention.

What I claim and desire to protect by Letters Patent is:

1. A sulfur dioxide addition product selected from the group consisting of the mono(sulfur dioxide) adduct of 1,4-diazabicyclo[2.2.2]octane and the di(sulfur dioxide) adduct of 1,4-diazobicyclo[2.2.2]octane.

2. The di(sulfur dioxide) adduct of 1,4-diazabicyclo[2.2.2]octane.

3. The mono(sulfur dioxide) adduct of 1,4-diazabicyclo[2.2.2]octane.

References Cited

UNITED STATES PATENTS

| | | | |
|---|---|---|---|
| 3,112,320 | 11/1963 | Farkas | 260—268 |
| 3,169,992 | 2/1965 | Henn | 260—268 X |
| 3,459,684 | 8/1969 | Wilson | 260—291.7 X |

DONALD G. DAUS, Primary Examiner

U.S. Cl. X.R.

260—75 NC, 77.5 AC, 79.3, 268 PL, 268 T, 294.4, 294.7 B